United States Patent
Spencer et al.

(10) Patent No.: US 7,401,181 B1
(45) Date of Patent: Jul. 15, 2008

(54) SYSTEM AND METHOD FOR COMPARAND REUSE

(75) Inventors: Kelvin Spencer, Kanata (CA); Farhad Shafai, Kanata (CA); Gregory F. Soprovich, Nepean (CA)

(73) Assignee: Core Networks LLC, Las Vegas, NV (US)

( * ) Notice: Subject to any disclaimer, the term of this patent is extended or adjusted under 35 U.S.C. 154(b) by 327 days.

(21) Appl. No.: 10/449,485

(22) Filed: May 29, 2003

Related U.S. Application Data

(60) Provisional application No. 60/384,873, filed on May 29, 2002.

(51) Int. Cl.
*G06F 12/00* (2006.01)
*G11C 15/00* (2006.01)

(52) U.S. Cl. ................................. 711/108; 365/49.1
(58) Field of Classification Search ............... 711/108; 365/49, 50
See application file for complete search history.

(56) References Cited

U.S. PATENT DOCUMENTS

| | | | | |
|---|---|---|---|---|
| 4,888,731 A * | 12/1989 | Chuang et al. | .................. | 365/49 |
| 4,890,260 A * | 12/1989 | Chuang et al. | .................. | 365/49 |
| 4,897,785 A * | 1/1990 | Zuger | .................. | 711/216 |
| 4,928,260 A * | 5/1990 | Chuang et al. | .................. | 365/49 |
| 6,137,707 A * | 10/2000 | Srinivasan et al. | .................. | 365/49 |
| 6,230,236 B1 * | 5/2001 | Schultz et al. | .................. | 711/108 |
| 6,289,414 B1 * | 9/2001 | Feldmeier et al. | .................. | 711/108 |
| 6,490,353 B1 * | 12/2002 | Tan | .................. | 380/37 |
| 6,510,069 B2 * | 1/2003 | Chien | .................. | 365/49 |
| 6,526,474 B1 * | 2/2003 | Ross | .................. | 711/108 |
| 6,629,099 B2 * | 9/2003 | Cheng | .................. | 707/10 |
| 6,772,279 B1 * | 8/2004 | Sun et al. | .................. | 711/108 |
| 6,804,744 B1 * | 10/2004 | Abbas | .................. | 711/108 |
| 6,892,273 B1 * | 5/2005 | James et al. | .................. | 711/108 |
| 6,906,936 B1 * | 6/2005 | James et al. | .................. | 365/49 |
| 7,007,151 B1 * | 2/2006 | Ely et al. | .................. | 711/202 |
| 2003/0135691 A1 * | 7/2003 | Srinivasan | .................. | 711/108 |
| 2004/0128434 A1 * | 7/2004 | Khanna et al. | .................. | 711/108 |

OTHER PUBLICATIONS

U.S. Appl. No. 11/469,248, filed Aug. 31, 2006, Spencer et al.
Restriction Requirement dated Oct. 30, 2007, regarding Appl. No. 11/469,248, filed Aug. 31, 2006, 6 pages.
Response to Restriction Requirement filed Nov. 30, 2007, regarding U.S. Appl. No. 11/469,248, filed Aug. 31, 2006, 1 page.

\* cited by examiner

*Primary Examiner*—Matt Kim
*Assistant Examiner*—Michael Krofcheck
(74) *Attorney, Agent, or Firm*—Foley & Lardner LLP

(57) ABSTRACT

An invention is provided for using a comparand provided to a CAM for multiple CAM operations without requiring the comparand to be reloaded from a host processor for each CAM operation. The invention includes a comparand data register that is capable of storing a comparand. Associated with the comparand data register, is a plurality of result registers. In operation, the comparand is provided as input data to the CAM for a plurality of search operations. For each search operation, the result is stored in one of the plurality of result registers. In this manner, the comparand stored in the data register can be reused for multiple search operations, with each result stored in a separate result register.

17 Claims, 4 Drawing Sheets

SYSTEM AND METHOD FOR COMPARAND REUSE

CROSS REFERENCE TO RELATED APPLICATIONS

This application claims priority from U.S. Provisional Patent Application No. 60/384,873 filed May 29, 2002, and entitled "Comparand Reuse," which is incorporated herein by reference.

BACKGROUND OF THE INVENTION

1. Field of the Invention

This invention relates generally to content addressable memory searching, and more particularly to a dispatch device capable of reusing comparand data for multiple searches without requiring a host processor to reload the comparand for each search operation.

2. Description of the Related Art

In today's computer networks, data generally is divided into smaller quantities, known as packets, for transmission. Associated with each packet is a header, which includes information such as the origin of the packet and the packet's intended destination. The header is examined to classify and forward each packet through a network to its final destination, generally utilizing a content addressable memory (CAM) semiconductor device.

CAMs provide performance advantages over conventional memory devices having conventional memory search algorithms, such as binary or tree-based searches, by comparing the desired search term, or comparand, against the entire list of entries simultaneously, giving an order-of-magnitude reduction in the search time. For example, a binary search through a non-CAM based database of 1000 entries may take ten separate search operations whereas a CAM device with 1000 entries may be searched in a single operation, resulting in significant time and processing savings. Internet routers often include a CAM for searching the address of specified data, allowing the routers to perform fast address searches to facilitate more efficient communication between computer systems over computer networks.

Conventional CAMs typically include a two-dimensional row and column content addressable memory core array of cells. In such an array, each row typically contains an address, pointer, or bit pattern entry. In this configuration, a CAM may perform "read" and "write" operations at specific addresses as is done in conventional random access memories (RAMs). However, unlike RAMs, data "search" operations that simultaneously compare a bit pattern of data against an entire list (i.e., column) of pre-stored entries (i.e., rows) can be performed.

Hence, a CAM allows the entire contents of the memory to be searched and matched instead of having to specify one or more particular memory locations in order to retrieve data from the memory. Thus, a CAM may be used to accelerate any application requiring fast searches of a database, list, or pattern, such as in database machines, image or voice recognition, or computer and communication networks.

Various algorithms are conventionally used to examine the information contained in the header of a packet. For example, table-based algorithms can be implemented using CAMs. In this case, the entries of a CAM are preloaded with routing and other information, and the CAM is used as an associative array.

In operation, a CAM is presented with information, hereafter referred to as a comparand, that it compares with information previously loaded into its entries. The action of comparing a comparand with information previously loaded into the CAM entries is referred to as a look-up or search operation. If the look-up or search operation is successful, a suitable result is returned. Otherwise the CAM indicates the look-up or search operation failed or "missed."

In a typical CAM and host processor configuration, the host processor writes header information into the Dispatch Device, which then supplies the header information to the CAM. The CAM then performs the look-up or search operation and returns the results to the dispatch device, which collects the results and provides the results to the host processor.

Data is transmitted between the host processor and the dispatch device using a bus. However, the bus width, which is the number of wires that connect the host processor to the dispatch device, is usually much less than the number of bits in the header data to be applied to the CAM as a comparand. As a result, when using a CAM that performs look-up or search operations very quickly, the time to transfer comparand information from the host processor to the dispatch device may be a significant performance bottleneck.

A header for a packet is a sequence of bits, wherein different groups of bits are utilized for different purposes. Hence, to properly classify and forward a packet, several look-up operations may be required on portions of the header. If the entire header must be re-written by the host processor into the Dispatch Device for each look-up or search operation required on a packet, the time required to classify and forward each packet can significantly affect the speed of the routing equipment.

In view of the foregoing, there is a need for systems and methods for that reduce the number of times a comparand must be written to a dispatch device. The methods should allow a comparand to be reused for multiple search operations when appropriate. In addition, when a new comparand varies from a previous comparand by very little, the method should allow the stored comparand to be slightly altered and reused to avoid requiring another comparand write to the dispatch device.

SUMMARY OF THE INVENTION

Broadly speaking, the present invention fills these needs by providing a device capable of using a comparand, or portions of a comparand, for multiple look-up or search operations in various tables within a CAM without requiring a host processor to reload any portion of the comparand for successive look-up or search operations. In one embodiment, a dispatch device for providing a comparand to a CAM is disclosed. The dispatch device includes a comparand data register that is capable of storing a comparand. Associated with the comparand data register, is a plurality of result registers. In operation, the comparand is provided as input data to the CAM for a plurality of search operations. For each search operation, the result is stored in one of the plurality of result registers. In one aspect, the dispatch device can include comparand overlay logic that alters selected bits of the comparand prior to providing the comparand to the CAM. In this aspect, the comparand overlay logic copies the comparand to a temporary comparand memory prior to altering selected bits of the comparand stored in the temporary comparand memory. The comparand overlay logic receives a comparand overlay pointer indicating particular bits within the comparand to modify, and a comparand overlay data value indicating data to write to the particular bits indicated by the comparand overlay pointer. The dispatch device also can include sub-comparand logic that selects a portion of the comparand, which can be provided to the CAM for a search operation. In this aspect, the sub-comparand logic copies the portion of the comparand to a temporary comparand memory prior to providing the sub-comparand stored in the temporary comparand memory to the CAM for a search operation. The sub-comparand logic receives a sub-comparand pointer indicating a most significant nibble of the portion of the comparand within the comparand, and a sub-comparand size value indicating a size of the portion of the comparand. Optionally, the dispatch device can include a plurality of context registers, with each context register including a comparand data register and a plurality of result registers associated with the comparand data register.

In an additional embodiment, a method is disclosed for providing a comparand to a CAM. The method includes receiving a comparand and storing the comparand in a comparand data register. The comparand is provided to a CAM for use in a search operation, and a result is received from the CAM. The result is stored in one of a plurality of result registers associated with the comparand data register. In this manner, additional searches can be performed using the comparand stored in the comparand data register, with a result for each search operation stored in one of the plurality of result registers. In one aspect, the method can include receiving a comparand overlay pointer indicating particular bits within the comparand to modify, and receiving a comparand overlay data value indicating data to write to the particular bits indicated by the comparand overlay pointer. In this aspect, the comparand can be copied to a temporary comparand memory, and a value located at a position in the comparand stored in the temporary comparand memory indicated by the comparand overlay pointer can be replaced with the comparand overlay data value. Optionally, a sub-comparand pointer indicating a most significant nibble of a portion of the comparand can be received along with a sub-comparand size data value indicating a size of a sub-comparand. The portion of the comparand having a most significant nibble indicated by the sub-comparand pointer and a size indicated by the sub-comparand size data value is copied to a temporary comparand memory for use in search CAM operations.

A system for providing a comparand to a CAM is disclosed in a further embodiment of the present invention. The system includes a host processor, a CAM, and a dispatch device in communication with the host process and the CAM. The dispatch device includes a plurality of context registers for use with individual processing threads. Each context register includes a comparand data register capable of storing a comparand and a plurality of result registers associated with the comparand data register. The host register can store a comparand in a selected comparand data register, which can be utilized for a plurality of search operations in the CAM. A result for each search operation is stored in one of the plurality of result registers associated with the selected compared data register. As above, the dispatch device can include comparand overlay logic that alters selected bits of the comparand prior to providing the comparand to the CAM. The dispatch device can also include sub-comparand logic that selects a portion of the comparand, which can be provided to the CAM for a search operation. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a using a comparand, or portions of a comparand, for multiple look-up or search operations in various tables within a CAM without requiring a host processor to reload any portion of the comparand for successive look-up or search operations. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
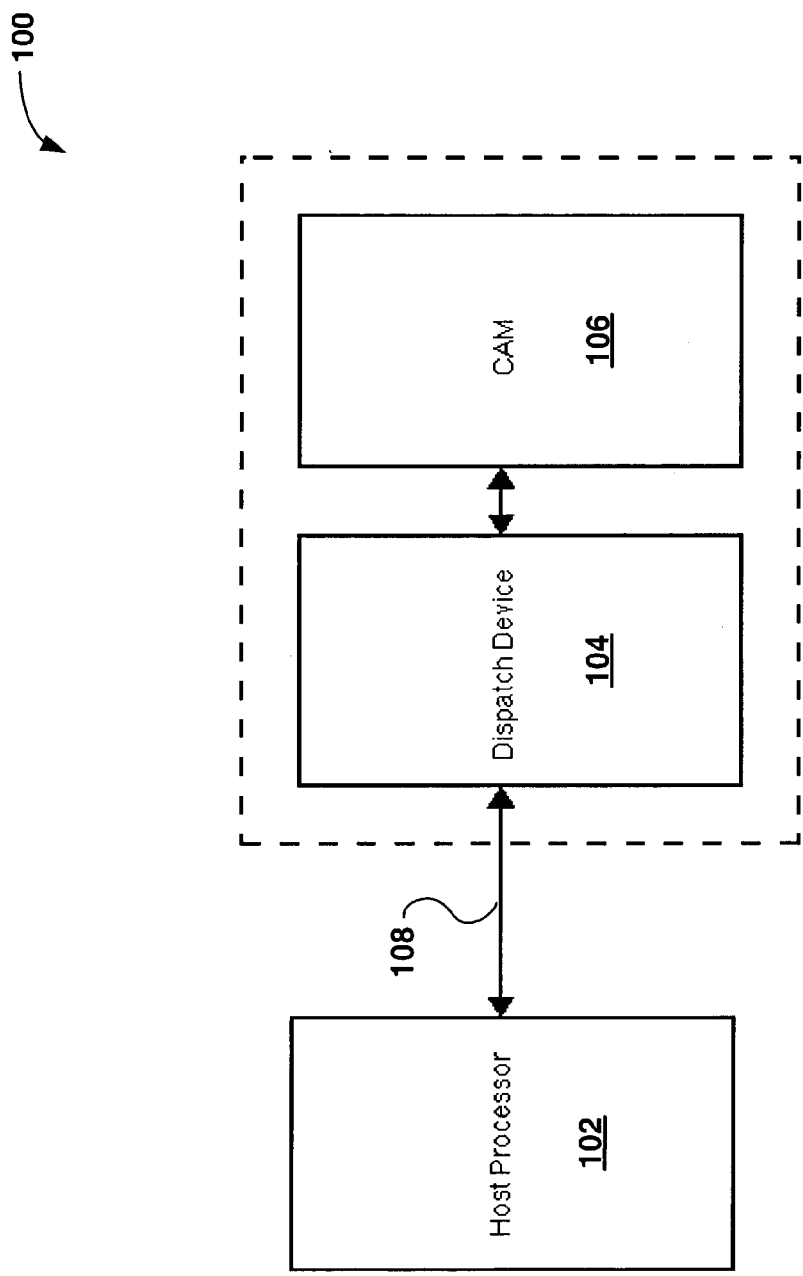
FIG. 1 is a block diagram showing a CAM and host processor configuration, in accordance with an embodiment of the present invention.

FIG. 1 is a block diagram showing a CAM and host processor configuration 100, in accordance with an embodiment of the present invention. As illustrated in FIG. 1, the CAM and host processor configuration 100 includes a CAM 106 coupled to a dispatch device 104, which is a device utilized to dispatch look-up or search operations from a host processor 102 to the CAM 106. In operation, the host processor 102 typically writes header information into the Dispatch Device 104, which then supplies the header information to the CAM 106. The CAM 106 then performs the look-up or search operation and returns the results to the dispatch device 104, which collects the results and provides the results to the host processor 102.

Data is transmitted between the host processor 102 and the dispatch device 104 using a bus 108. However, as mentioned previously, the bus width is usually much less than the number of bits in the header data to be applied to the CAM 106 as a comparand. As a result, when using a CAM 106 that performs look-up or search operations very quickly, the time to transfer comparand information from the host processor to the dispatch device may be a significant performance bottleneck.

Figure 2:
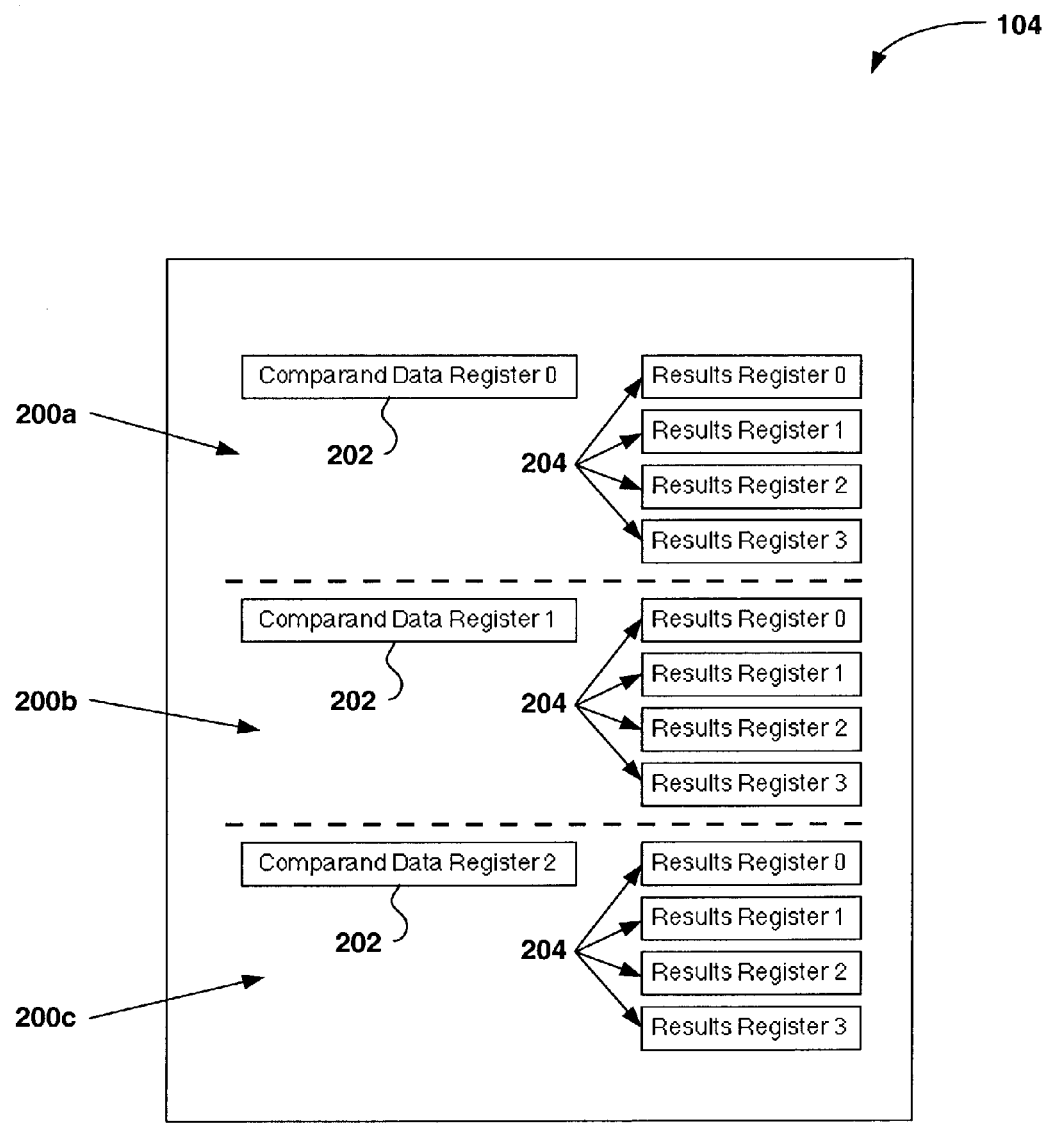
FIG. 2 is a block diagram showing a dispatch device having comparand reuse capabilities, in accordance with an embodiment of the present invention.

To address this issue, embodiments of the present invention provide a dispatch device capable of using a comparand, or portions of a comparand, for multiple look-up or search operations in various tables within a CAM without requiring a host processor to reload any portion of the comparand for successive look-up or search operations. FIG. 2 is a block diagram showing a dispatch device 104 having comparand reuse capabilities, in accordance with an embodiment of the present invention. The dispatch device 104 includes a plurality of context registers 200a-200c. Each context register includes a comparand data register 202 and a plurality of associated result registers 204. Although FIG. 2 illustrates only three context registers 200a-200c, in should be noted that the dispatch device 104 can include any number of context registers 200a-200c. Similarly, although FIG. 2 illustrates only four result registers 204 associated with each comparand data register 202, any number of result registers 204 can be associated with each comparand data register 202.

The dispatch device 104 provides an efficient mechanism that allows the host processor's multiple processing threads to efficiently perform look-up operations, using a pipelined architecture and dedicated registers for each processing thread. To perform a look-up operation, the host processor transfers a comparand to the dispatch device 104. The dispatch device 104 stores the comparand in a comparand data register 202 of a particular context register 200a-200c. After performing the lookup operation using an associated CAM, the dispatch device 104 stores the results of the operation in a results register 204 associated with the comparand data register 202. The look-up operation is completed when the host processor receives the contents of the result register 204 from the dispatch device. When performing a look-up operation, the host processor transfers the comparand to a particular comparand data register 202 and selects a result register 204 that will store the results.

The host process can access the comparand data registers 202 and result registers 204 on the dispatch device using various techniques. For example, each comparand data register 202 and result register 204 can be accessed via a memory-mapped interface to which the host processor can read and write. Another example is a request-response interface where the host processor identifies a comparand data register 202 using a unique identifier when initiating a look-up operation and the results are returned to the host processor using the same identifier when the dispatch device 104 completes the look-up operation.

Generally, each context register 200a-200c should be dedicated to a single processing thread in the host processor. However, a single processing thread may use more than one context register 200a-200c. Once a comparand is loaded into a comparand data register 202, the comparand can be used for successive look-up or search operations without having to reload the comparand. Since each context register 200a-200c has n result registers 204, the host processor can dispatch up to n lookup operations for a single comparand without having to wait for the results or load the comparand multiple times. As a result, over-all system performance is improved.

For example, in the exemplary embodiment of FIG. 2, the host processor can load a comparand into comparand data register 0 202 of context register 200a. The host processor then dispatches a look-up operation specifying that the results should be stored in result register 0 204 associated with comparand data register 0 202 of context register 200a. The host processor can then dispatch up to three more searches by requesting the dispatch device 104 to use the comparand stored in comparand data register 0 202 of context register 200a and store the results in result registers 1 to 3 of context register 200a.

It is desirable for the host processor to modify parts of the comparand when issuing look-up and search commands using the same comparand data register 202. Embodiments of the present invention allow the host processor to overlay (temporarily replace) any portion of the comparand for a look-up or search operation. This allows the host processor to issue up to n look-up or search operations using the contents of one comparand data register 202 with effectively n different comparands. Reusing the contents of one comparand data register 202 for a plurality of different look-up and search operations significantly reduces the bus transactions between the host processor and the dispatch device 104, and thus increases the look-up through-put of the system.

One application for a comparand overlay is storing multiple tables in the CAM and searching for the same comparand in two or more of the tables. In this case, the overlay byte acts as a "table selector." Another application is searching for two comparands in the same table that differ by a few bits.

In one embodiment, the host processor provides two sets of data to the dispatch device 104: a comparand overlay pointer and a comparand overlay nibble. The comparand overlay pointer specifies a specific nibble, which is one or more data bits, within a comparand data register 202. The comparand overlay nibble is the data that will replace the appropriate nibble of the comparand data register 202 for look-up or search operations. This allows the host processor to overlay any nibble of the comparand data register 202 and issue a look-up or search operation without having to reload the comparand. It should be borne in mind that the comparand overlay pointer does not need to point to a nibble comprising multiple data bits. For example, the comparand overlay pointer can point to any arbitrary bit of the comparand. Similarly, the comparand overlay nibble does not have to be a nibble, that is, the comparand overlay nibble can be any arbitrary number of bits.

When overlaying a nibble within the comparand data register 202, the content of the comparand data register 202 does not require alteration. In one embodiment, the overlay is performed on a temporary copy of the comparand data register 202 in the dispatch device 104 to preserve the comparand transferred by the host processor. This allows the host processor to dispatch multiple searches using the one comparand data register 202.

Figure 3:
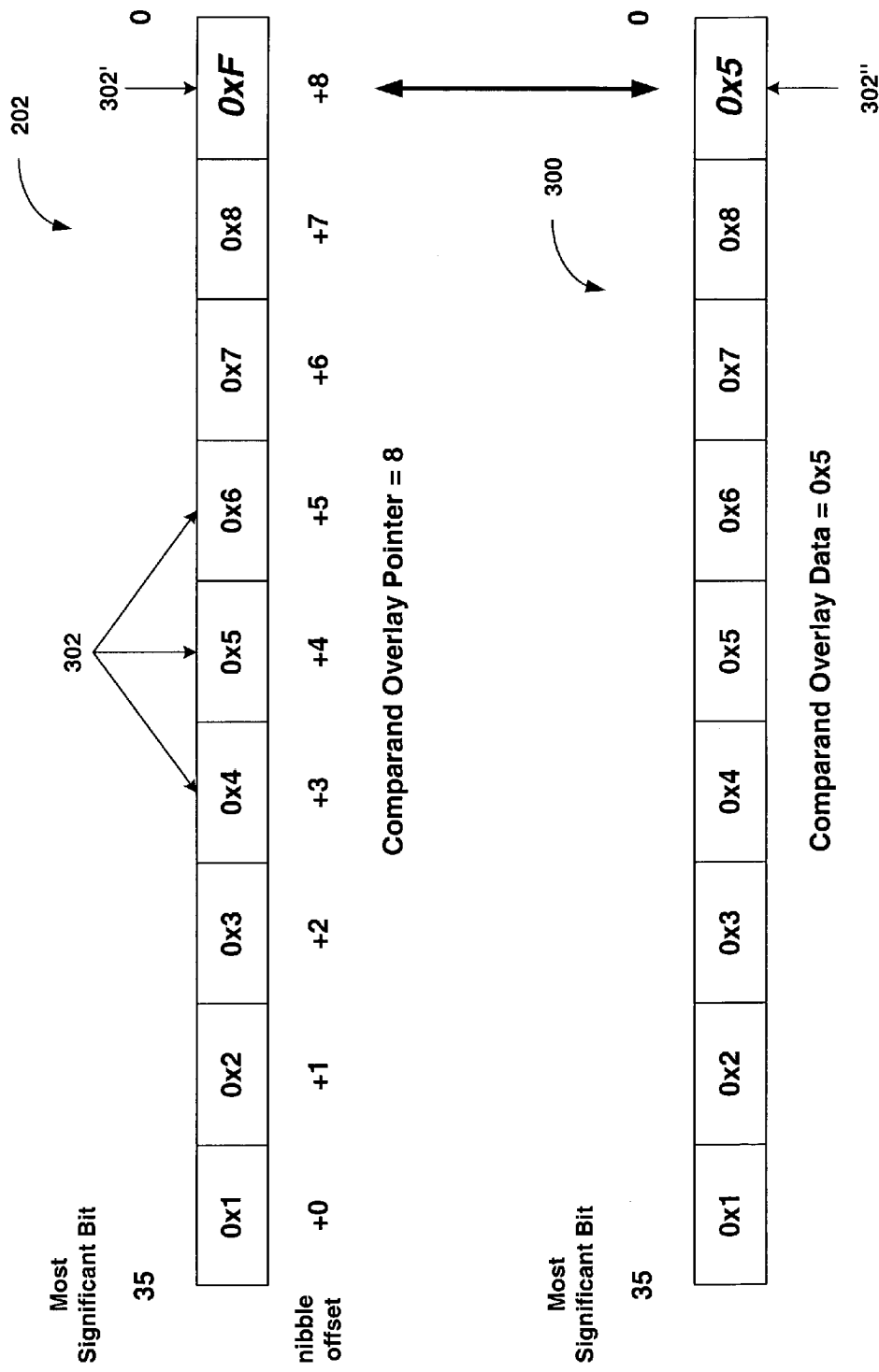
FIG. 3 is a block diagram showing an example of using a comparand overlay operation to perform table selection, in accordance with an embodiment of the present invention.

For example, FIG. 3 is a block diagram showing an example of using a comparand overlay operation to perform table selection, in accordance with an embodiment of the present invention. In a CAM, every entry is compared against the applied comparand. In order to have separate tables for different table-based algorithms in a CAM, a portion of every entry in the CAM is assigned a table identifier. To select a particular table, the applied comparand indicates the desired table identifier in its corresponding bits.

For example, if there are to be nine tables of 36-bit entries stored in a CAM, then four bits of each entry are dedicated as a table identifier. In the example of FIG. 3, the least significant four bits of each entry are encoded with the hexadecimal values: 0x0, 0x1, 0x2, 0x3, 0x4, 0x5, 0x6, 0x7, and 0x8, depending upon which table the entry is to be associated with. When the comparand is loaded into the comparand data register 202, the least significant four bits of the 36-bit value can be written with any one of the table identifier values. In this manner, only the CAM entries of the corresponding table can possibly match the comparand because CAM entries in other tables will have a different least significant four bits.

To look-up an entry in the table that has entries with the table identifier 0x5, the host processor sets the comparand overlay point to 8 302' and the comparand overlay data to 0x5 in the dispatch device. When the look-up operation is initiated, the dispatch device creates a temporary copy 300 of the comparand 302. The dispatch device then replaces the bits at nibble offset 8 302", which is the least significant nibble of the temporary comparand copy 300, with 0x5. The temporary comparand copy 300 is then utilized to search the CAM array. It should be noted that it is not necessary for the least significant nibble of an entry to be assigned as the table identifier. The table identifier can reside in any nibble.

It is also desirable for the host processor to perform look-up and search operations using only a portion of a comparand. Embodiments of the present invention utilize a mechanism, referred to as a sub-comparand, to allow the host processor to select a portion of the comparand data register to utilize for a look-up or search operation. In this manner, the host processor can more efficiently store tables in the CAM array and improve the system throughput by reducing the amount of data transfers between the host processor and the dispatch device.

For example, without the sub-comparand feature, to look-up a 36-bit quantity in the middle of a 144-bit comparand would require a table of 144-bit entries, or, the host processor would have to use a different comparand data register for the 36-bit search. The sub-comparand feature of the embodiments of the present invention allows the host processor to look-up the 36-bit quantity in 36-bit tables thus significantly reducing the number of words required for a table and removes the need for the host processor to use a different comparand data register.

In one embodiment, the host processor provides two sets of data to the dispatch device for sub-comparand operations: a sub-comparand pointer and a sub-comparand size. The sub-comparand pointer identifies the most-significant nibble in the comparand data register that will be become the most significant nibble of the comparand used for the look-up or search operation. The sub-comparand size indicates the size of the sub-comparand that will be used for the look-up or search operation. It should be borne in mind that the sub-comparand pointer does not need to point to a nibble. For example, the sub-comparand pointer can point to any arbitrary bit of the comparand. Similarly, the sub-comparand size does not have to be a nibble, that is, the sub-comparand size can be any arbitrary number of bits.

When using a sub-comparand within the comparand data register, the content of the comparand data register does not require alteration. In one embodiment, the sub-comparand selection is performed using a temporary copy of the comparand data register in the dispatch device to preserve the comparand transferred by the host processor. This allows the host processor to dispatch multiple searches using the one comparand data register.

Figure 4:
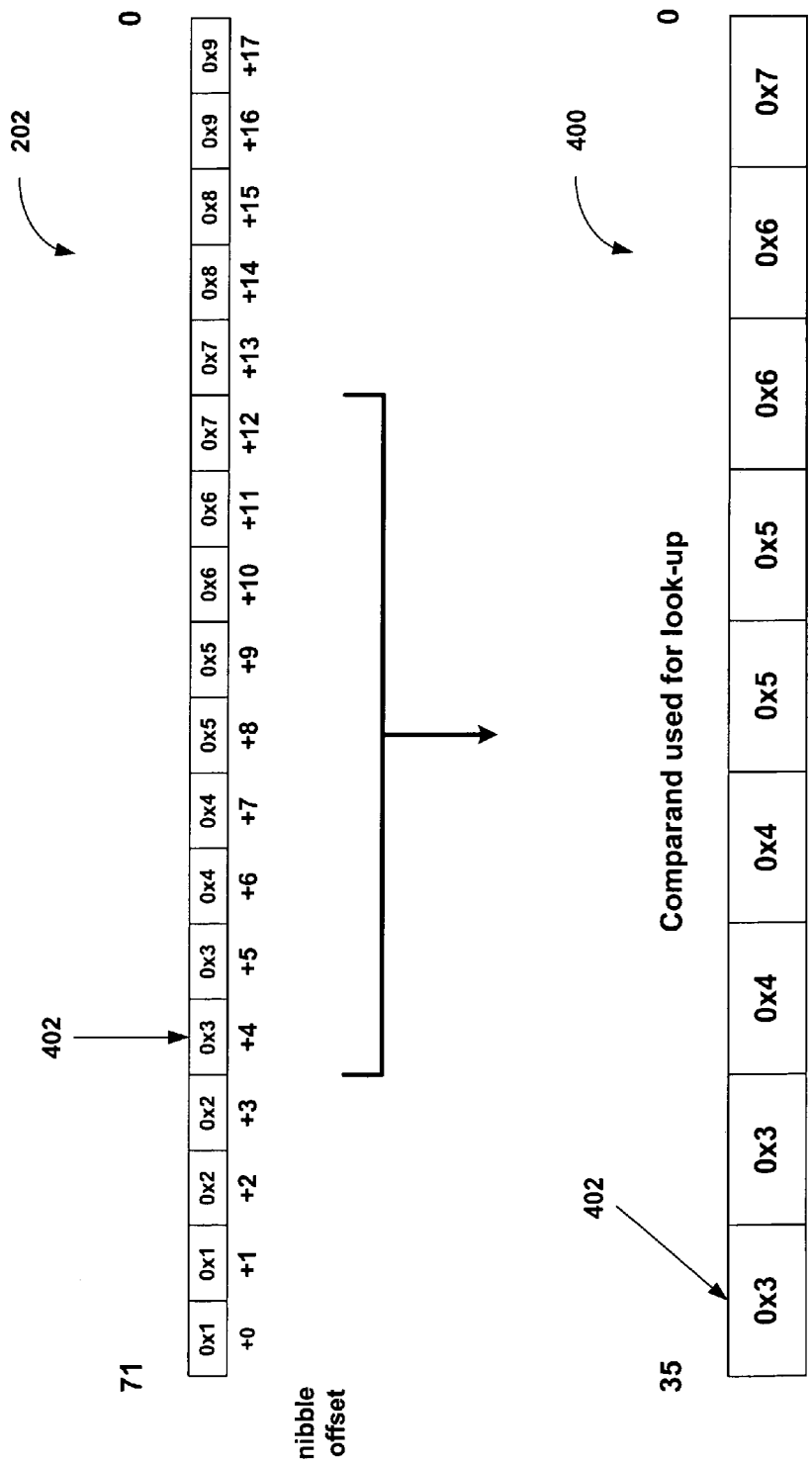
FIG. 4 is a block diagram showing an example of using a sub-comparand operation, in accordance with an embodiment of the present invention.

For example, FIG. 4 is a block diagram showing an example of using a sub-comparand operation, in accordance with an embodiment of the present invention. In the example of FIG. 4, the comparand data register 202 includes a 72-bit hexadecimal quantity 0x112233445566778899. To perform a look-up operation using the 36-bit hexadecimal sub-comparand 0x334455667, the host processor provides a sub-comparand pointer value of 4 and a sub-comparand size of 36. In this example, the dispatch device will select the sub-comparand having the most significant nibble starting at nibble 402 at offset +4, and having a size of 36-bits. This generates the sub-comparand 400, which can be utilized for look-up operations in tables of 36-bit entries.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A dispatch device for providing a comparand to a content addressable memory (CAM), comprising:
    a comparand data register capable of storing a comparand, the comparand comprising a collection of bits;
    a plurality of result registers associated with the comparand data register, wherein the comparand can be provided as input data to a CAM for a plurality of search operations, and wherein a result for at least one search operation is stored in one of the plurality of result registers; and
    comparand overlay logic to alter selected bits of the comparand prior to providing the comparand to the CAM, wherein the comparand overlay logic is adapted to copy the comparand to a temporary comparand memory prior to altering selected bits of the comparand stored in the temporary comparand memory.

2. The dispatch device as recited in claim 1, further comprising logic to modify the comparand and generate a new comparand, wherein the new comparand can be provided as input data to the CAM for a plurality of search operations.

3. The dispatch device as recited in claim 1, wherein the comparand overlay logic is adapted to receive a comparand overlay pointer indicating particular bits within the comparand to modify.

4. The dispatch device as recited in claim 3, wherein the comparand overlay logic is adapted to receive a comparand overlay data value indicating data to write to the particular bits indicated by the comparand overlay pointer.

5. The dispatch device as recited in claim 1, further comprising sub-comparand logic to select a portion of the comparand, wherein the portion of the comparand can be provided to the CAM for a search operation.

6. The dispatch device as recited in claim 5, wherein the sub-comparand logic is adapted to copy the portion of the comparand to a temporary comparand memory prior to providing a sub-comparand stored in the temporary comparand memory to the CAM for a search operation.

7. The dispatch device as recited in claim 5, wherein the sub-comparand logic is adapted to receive a sub-comparand pointer and sub-comparand size data value, the sub-comparand pointer and the sub-comparand size data value together indicating a collection of bits within the comparand to utilize for a search operation.

8. A method for providing a comparand to a content addressable memory (CAM), comprising:
    receiving a comparand, the comparand comprising a collection of data bits;
    storing the comparand in a comparand data register;
    copying the comparand to a temporary comparand memory;
    altering selected bits of the comparand stored in the temporary comparand memory, wherein altering the selected bits comprises:
        receiving a comparand overlay pointer indicating particular bits within the comparand to modify; and
        receiving a comparand overlay data value indicating data to write to the particular bits indicated by the comparand overlay pointer;
    providing the comparand stored in the temporary comparand memory to a CAM for use in a search operation;
    receiving a result from the CAM; and
    storing the result in one of a plurality of result registers associated with the comparand data register, wherein additional searches can be performed using the comparand stored in the comparand data register, and wherein the result for at least one search operation is stored in one of the plurality of result registers.

9. The method as recited in claim 8, further comprising modifying the comparand stored in the temporary comparand memory to generate a new comparand, wherein the new comparand can be provided as input data to the CAM for a plurality of search operations.

10. The method as recited in claim 8, further comprising replacing a value located at a position in the comparand stored in the temporary comparand memory indicated by the comparand overlay pointer with the comparand overlay data value.

11. A system for providing a comparand to a content addressable memory (CAM), comprising:
a host processor;
a content addressable memory (CAM); and
a dispatch device in communication with the host processor and the CAM, the dispatch device comprising:
a comparand data register capable of storing a comparand, the comparand comprising a collection of bits;
a plurality of result registers associated with the comparand data register, wherein the comparand can be provided as input data to a CAM for a plurality of search operations, and wherein a result for at least one search operation is stored in one of the plurality of result registers; and
a comparand overlay logic to alter selected bits of the comparand prior to providing the comparand to the CAM, wherein the comparand overlay logic is adapted to copy the comparand to a temporary comparand memory prior to altering selected bits of the comparand stored in the temporary comparand memory.

12. The system of claim 11, further comprising logic to modify the comparand and generate a new comparand, wherein the new comparand can be provided as input data to the CAM for a plurality of search operations.

13. The system of claim 11, wherein the comparand overlay logic is adapted to receive a comparand overlay pointer indicating particular bits within the comparand to modify.

14. The system of claim 13, wherein the comparand overlay logic is adapted to receive a comparand overlay data value indicating data to write to the particular bits indicated by the comparand overlay pointer.

15. The system of claim 11, further comprising sub-comparand logic to select a portion of the comparand, wherein the portion of the comparand can be provided to the CAM for a search operation.

16. The system of claim 15, wherein the sub-comparand logic is adapted to copy the portion of the comparand to a temporary comparand memory prior to providing a sub-comparand stored in the temporary comparand memory to the CAM for a search operation.

17. The system of claim 15, wherein the sub-comparand logic is adapted to receive a sub-comparand pointer and sub-comparand size data value, the sub-comparand pointer and the sub-comparand size data value together indicating a collection of bits within the comparand to utilize for a search operation.

* * * * *